(12) United States Patent
Watson, Sr.

(10) Patent No.: US 6,386,464 B1
(45) Date of Patent: May 14, 2002

(54) APPARATUS FOR LAWN IRRIGATION

(76) Inventor: Ricardo Watson, Sr., 538 Sandy Walk, Stafford, TX (US) 77477

( * ) Notice: Subject to any disclaimer, the term of this patent is extended or adjusted under 35 U.S.C. 154(b) by 0 days.

(21) Appl. No.: 09/757,104

(22) Filed: Jan. 10, 2001

(51) Int. Cl.⁷ .............................................. B05B 15/10
(52) U.S. Cl. ...................... 239/203; 239/268; 239/276
(58) Field of Search .......................... 239/237, 240–242, 239/273, 276, 200–206, 266–269

(56) References Cited

U.S. PATENT DOCUMENTS

| | | | |
|---|---|---|---|
| 3,964,685 A | 6/1976 | Chauvigne | 66/4 |
| 4,003,520 A | 1/1977 | Balley | 205/10 |
| 4,087,049 A | 5/1978 | Trains | 14/267 |
| 4,784,329 A | 11/1988 | Heren | 26/498 |
| 4,884,751 A | 12/1989 | Pettit | 34/468 |
| 5,213,262 A | 5/1993 | Violette | 6/203 |
| 5,292,071 A | 3/1994 | Kruer | 4/242 |
| 5,355,905 A | 10/1994 | Burgess et al. | 137/1 |
| 5,368,229 A | 11/1994 | Hayes et al. | 4/69 |
| 5,947,386 A | 9/1999 | Dick et al. | 6/201 |
| 6,152,651 A | 11/2000 | Glidewell et al. | 405/36 |

*Primary Examiner*—Lisa Ann Douglas
(74) *Attorney, Agent, or Firm*—Delphine M. James

(57) ABSTRACT

In the present device is provided for irrigating lawn and garden areas. Buried below ground level are a pop-up sprinkler and a housing chamber. The underground pop-up sprinkler has a bottom inlet with a female fitting mechanism affixed therein. Concentrically positioned within the housing chamber is an inner pipe member with a female fitting mechanism affixed within the opened bottom of the inner pipe member. Interconnecting the pop-up to the housing is an U-shaped second pipe member having two legs with male fitting mechansim affixed to the upper end of each leg. The male fitting mechanism of the first leg is securely attached to the female fitting mechanism of the pop-up sprinkler. The male fitting mechansim of the second leg is securely attached to the female fitting mechanism attached to the bottom of the inner pipe member situated within the housing chamber.

18 Claims, 10 Drawing Sheets

APPARATUS FOR LAWN IRRIGATION

BACKGROUND

The present invention relates to a lawn irrigation device, more particular a device that transports water from an above ground water supply to underground sprinkler devices.

Underground sprinkler systems are used to distribute water to lawns. The system includes a network of underground poly vinyl chloride (PVC) piping which supplies water to the underground sprinkler heads. Installing an underground sprinkler system requires extensive planning and is a lengthy process. The installation process involves digging trenches, installing PVC piping, installing back-flow connections with the underground water supply line to prevent water from flowing back into the main municipality underground pipe line, electrical wiring to a control panel, and verifying the installation meets city code. The deep trenching along with the back-flow connections make installation costs very expensive.

Sprayers of the underground sprinkler heads are strategically set. Generally, they are unobtrusive and disappear when not in use. In addition, the underground sprayers and pipes blend into the landscape making the use of underground sprinklers very convenient and appealing.

A known problem which arise from the use of above ground movable sprinklers is that they are not set at a permanent location and must be removed to cut the lawn. In addition, above ground sprinklers spray angles are hard to adjust to the actual shapes of individual lawn and garden areas to be irrigated. Therefore, water may be wasted over patios and side walks.

What is needed is a simple, inexpensive means of watering lawns utilizing underground water sprinkler heads without the network of underground PVC piping and electrical wiring to a control box.

SUMMARY

In the present invention, a device is provided for irrigating lawn and gardens. One embodiment of the present invention provides an underground pop-up sprinkler having a bottom inlet with a female fitting means affixed therein. At a point relative to the pop-up sprinkler a housing is also buried below ground level. The housing comprises a chamber made out of a rigid plastic material having an opened top end and a tapered bottom which extend downward into a centrally located orifice. A cylindrical wall is situated between the top end and the bottom end of the housing chamber. An inner pipe member is concentrically positioned within the housing chamber. The inner pipe member has an externally threaded top portion and a female fitting means affixed within the bottom of the inner pipe member. The bottom of the inner pipe member is securely attached to the orifice in the bottom of the housing chamber. Connecting the tope end of the inner pipe member to a water hose, which is securely attached to an above ground water supply, is an elbow pipe fitting. Additionally, a protective lid rests upon the top end of the housing chamber. A spring hinge is configured to connect the lid to the outer wall of the housing chamber.

This embodiment of the present invention further includes, an U-shaped second pipe member having a base that is parallel to the ground surface and that extends the distance between the housing and pop-up sprinkler, a first leg that is perpendicular to the ground surface and that is buried beneath the pop-up sprinkler, and a second leg that is perpendicular to the ground surface and that is buried beneath the housing. The first leg of the second pipe member has a male fitting means attached to its upper end that is securely attached to the female fitting means located within the bottom inlet of the pop-up sprinkler. Additionally, the second leg of the second pipe member has a male fitting means attached to its upper end that is securely attached to the female fitting means located within the bottom end of the inner pipe member. Interconnecting the second pipe member with the pop-up sprinkler and the housing provides a conduit to transport water from an above ground water supply through the second pipe member to the pop-up sprinkler whereby the water is distributed across the lawn and garden area.

In an alternative embodiment of the present invention, a first pop-up sprinkler and at least one additional pop-up sprinkler are buried in a chain beneath ground level. Each pop-up sprinkler has bottom inlets with female fitting means affixed therein. Buried at a position relative to the last additional pop-up sprinkler in the chain is the housing as described in the above embodiment. Connected to the female fitting means located within the bottom inlet of each additional pop-up sprinkler is an extending pipe member interconnected with a T-Connector.

The alternative embodiment further includes two elbow pipe members buried below ground level. Affixed to the upper end of each elbow pipe member are male fitting means. The male fitting means attached to the first elbow pipe member is securely attached to the female fitting means located within the bottom inlet of the first pop-up sprinkler and the male fitting means attached to the second elbow pipe member is securely attached to the female fitting means located within the bottom of the inner pipe member.

If the alternative embodiment includes more than one additional pop-up sprinkler, the T-Connectors are interconnected into in a conduit. This conduit provides a means for interconnecting the first elbow pipe member to the second elbow pipe member whereby water is transported to each pop-up sprinkler buried in the chain.

DRAWINGS

DETAILED SPECIFICATION

Figure 1:
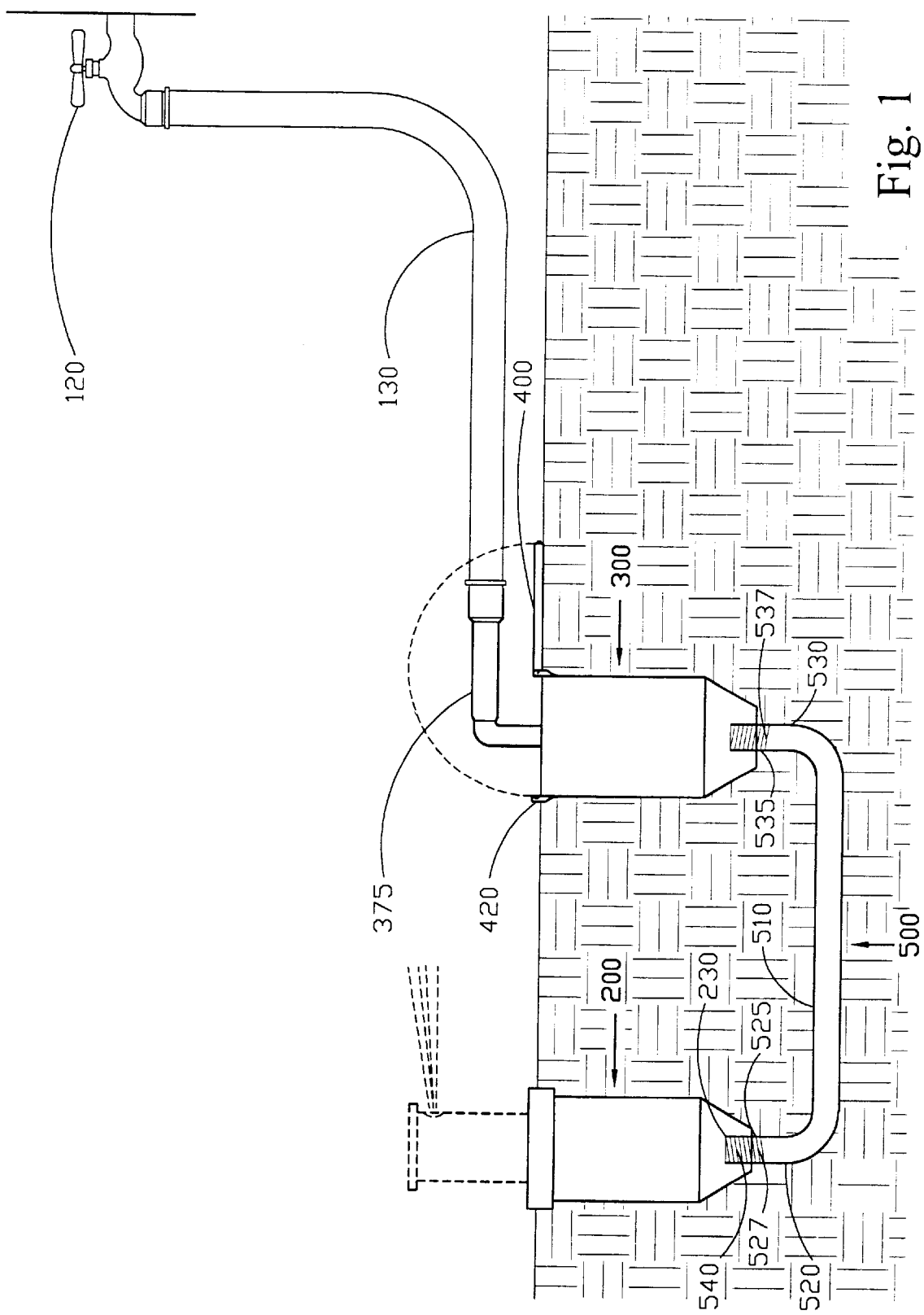
FIG. 1 is a perspective view of one embodiment of the present invention.

Referring to FIG. 1, an overall perspective view of the present invention is seen, a device (100) for irrigating lawn and gardens. In the illustrated embodiment, pop-up sprinkler (200) is shown buried below ground level in the lawn area.

At a position relative to pop-up sprinkler (200), housing (300) is also buried below ground level in the lawn area. The embodiment shown in FIG. 1 further includes, second pipe member (500) securely connected to pop-up sprinkler (200) and housing (300). By interconnecting pop-up sprinkler (200) to housing (300), second pipe member (500) provides a conduit which transports water from the above ground water supply, water faucet (120) to pop-up sprinkler (200).

Figure 2:
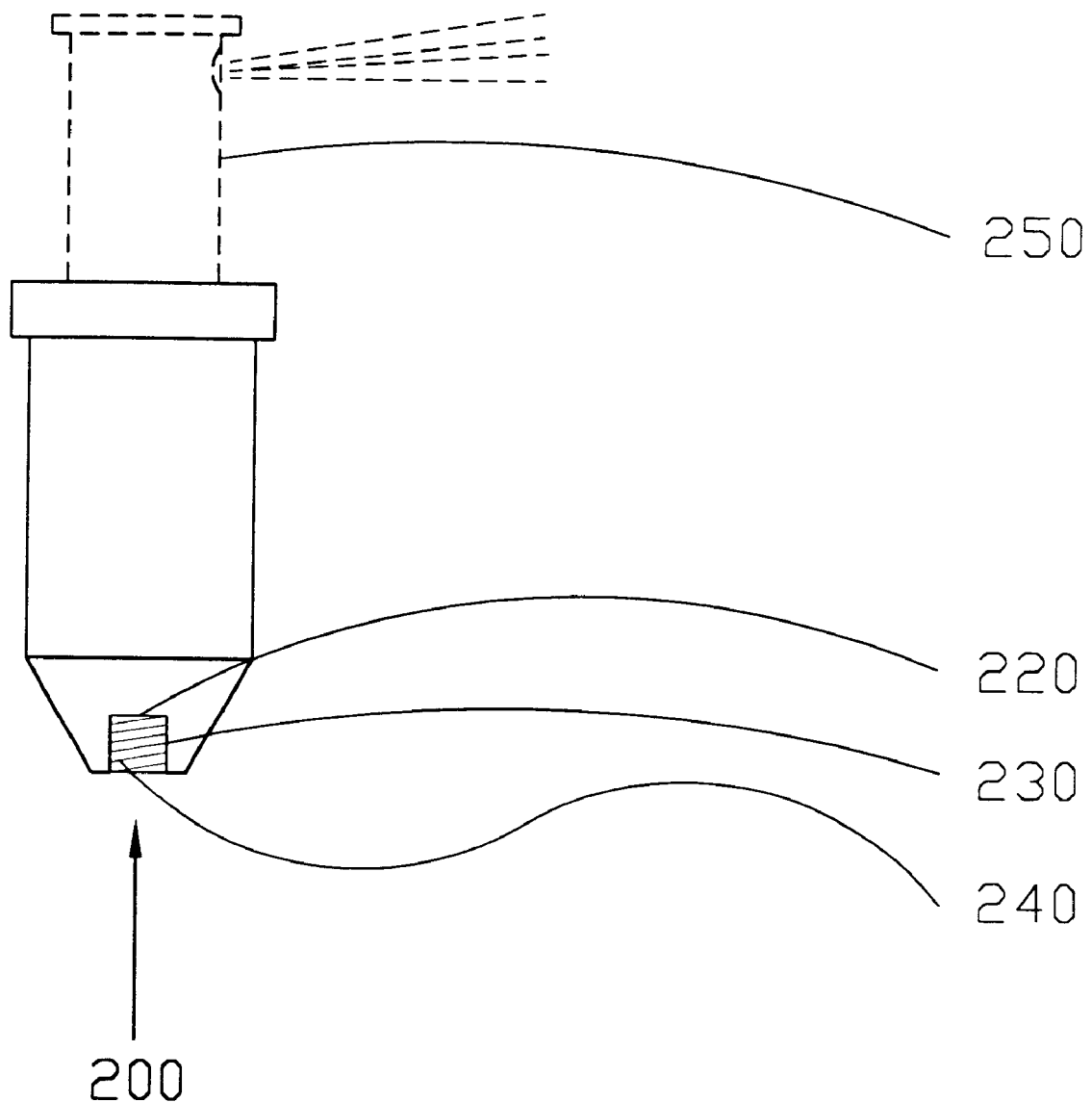
FIG. 2 is an exploded side view of the underground pop-up sprinkler.

Referring now to FIG. 2, there is shown an exploded side view of pop-up sprinkler (200). Pop-up sprinkler (200) is shown having bottom inlet (220) which receives water flow under pressure. Most models of pop-up sprinklers have a bottom inlet ranging in diameter between ½ inches to ¾ inches. Additionally, affixed within bottom inlet (220) is female fitting means (230) having interior threading (240) circumferentially surrounding bottom inlet (220). Typically, water flows under pressure into bottom inlet (220) whereby sprinkler head (250) raises to distribute water across the lawn and garden area. The present invention is adaptable to be used with any model of commercially available pop-up sprinkler.

Figure 3:
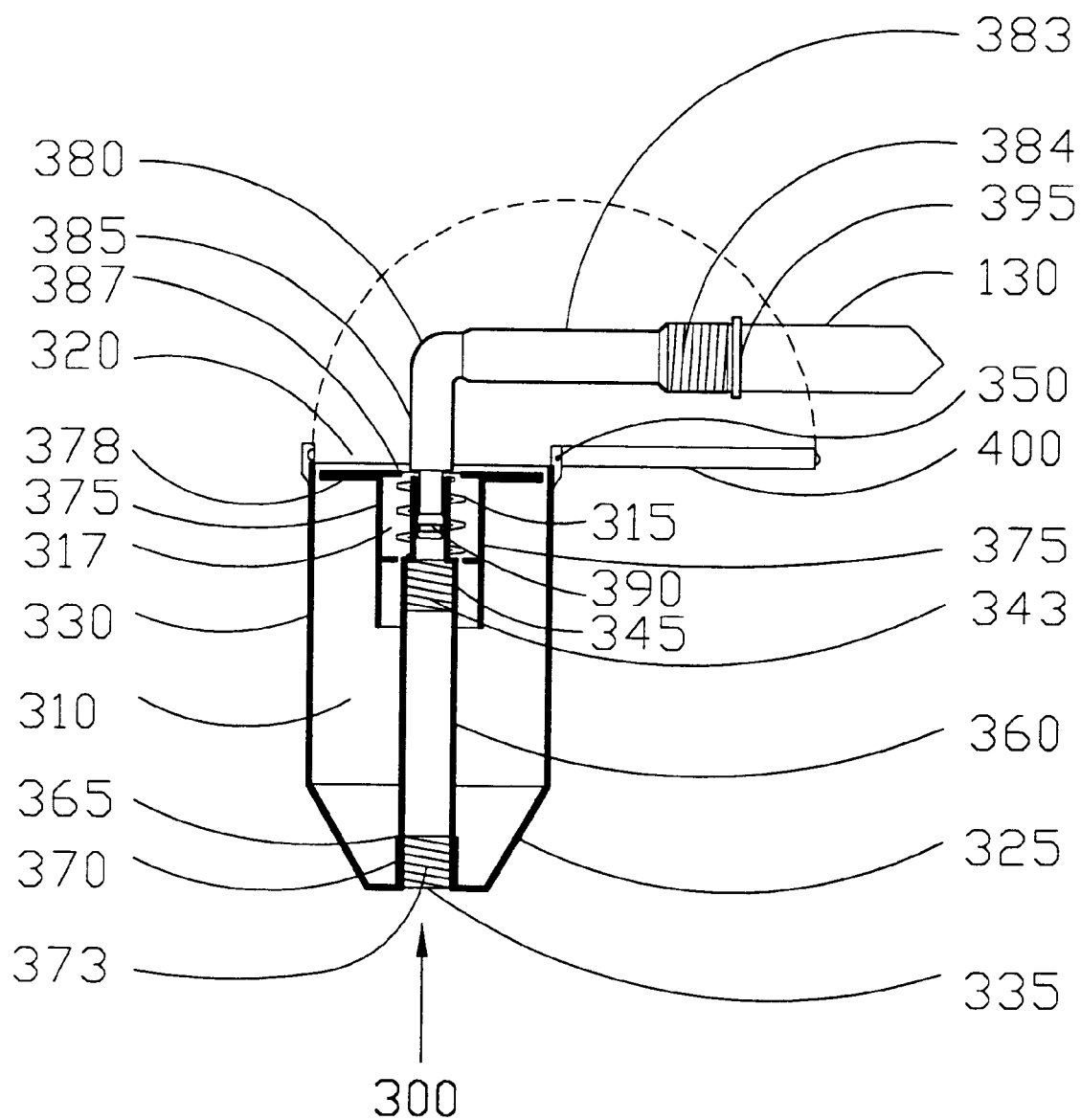
FIG. 3 is an exploded cross sectional view of the housing.

Referring now to FIG. 3, there is shown an exploded cross-sectional side view of housing (300). In the illustrated embodiment, housing (300) is shown having chamber (310) with opened top end (320) and tapered bottom (325) extending downward into centrally located orifice (335). Vertical cylindrical wall (330) is situated between opened top end (320) and tapered bottom (325). Housing (300) is depicted having protective lid (400) which has a diameter the size of opened top end (320). This embodiment further includes, spring hinge (350) configured to connect protective lid (400) to the outer wall of opened top end (320) of chamber (310) such that protective lid (400) opens parallel to the ground level.

The illustrated embodiment in FIG. 3 further includes, inner pipe member (360) concentrically positioned within chamber (310) of housing (300). In the illustrated embodiment, inner pipe member (360) has external threading (343) circumferentially disposed on top portion (345). Additionally, opened bottom end (365) of inner pipe member (360) has a diameter the same size as orifice (335) such that opened bottom end (365) of inner pipe member (360) firmly abuts orifice (335). Typically, opened bottom end (365) is securely attached to orifice (335) by applying cementing material where inner pipe member (360) and orifice (335) abuts. The secure connection between orifice (335) and inner pipe member (360) is required to support the pressure from the water flow. The illustrated embodiment further includes, opened bottom end (365) having female fitting means (370) with interior threading (373) circumferentially disposed within opened bottom end (365) of inner pipe member (360). In this embodiment, interior threading (373) of female fitting means (370) is used to connect to pipe fittings ranging in diameter between ½ inches to ¾ inches.

The embodiment of housing (300) illustrated in FIG. 3 further includes female snap connector (375) being securely connected to the external threading (343) of top portion (345) of inner pipe member (360). In order for inner pipe member to be completely situated within chamber (310), the length of inner pipe member (360) is adapted to fit the between female snap connector (375) and orifice (335). Surrounding female snap connector (375) is protective cover (378).

Figure 3A:
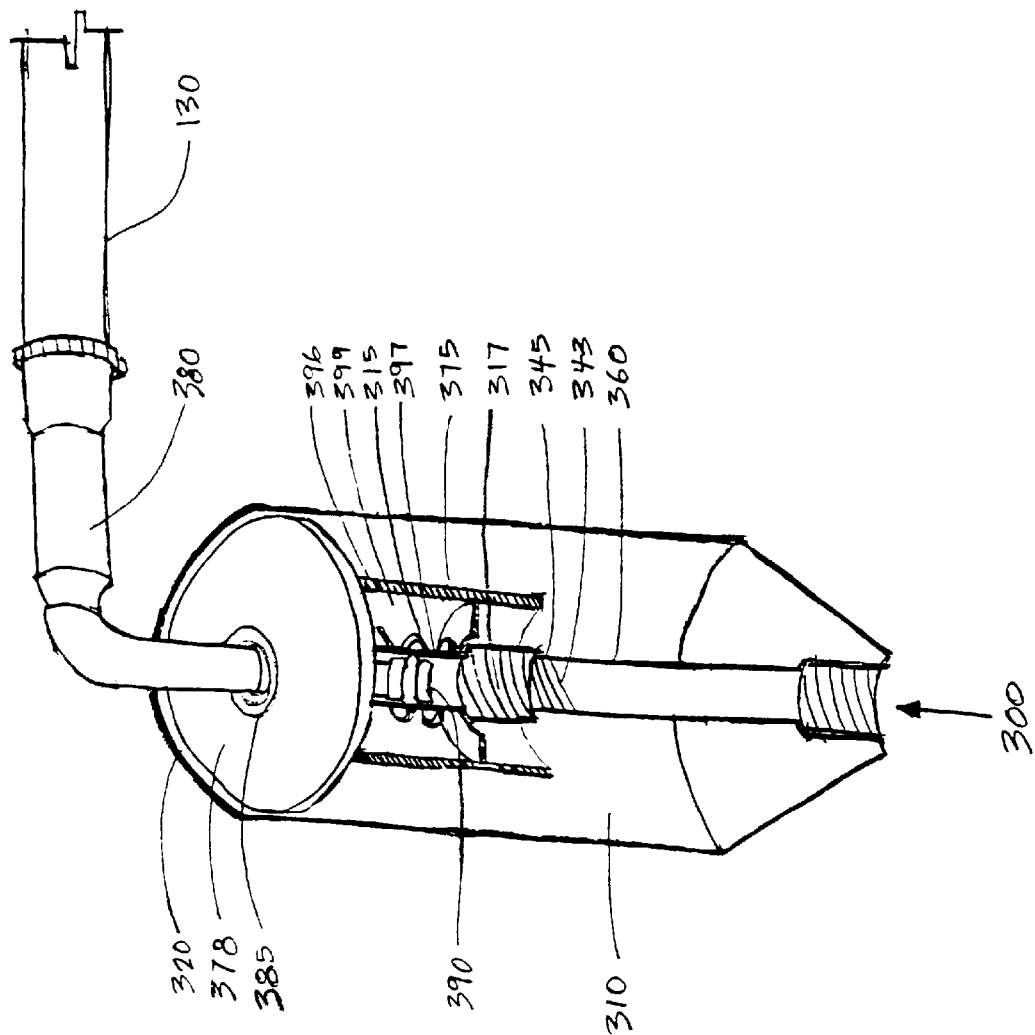
FIG. 3A is an exploded side view of the female snap connector.

Referring now to FIG. 3A, there is seen an exploded side view of female snap connector (375). In the illustrated embodiment, female snap connector (375) is depicted as being cylindrical in shape with top (396) and bottom (397). The bottom (397) of female snap connector (375) is shown screwed onto the external threading (343) of the top portion (345) of inner pipe member (360). In this kind of embodiment, the top (396) of female snap connector (375) is shown having inner section (397) concentrically positioned within outer section (399).

The illustrated embodiment in FIG. 3A further includes, protective cover (378) having a diameter slightly smaller than the opened top end (320) of chamber (310). Protective cover (378) diameter is such that protective cover (378) firmly rests within chamber (310). Additionally, protective cover (378) has a centrally located opening (386) with a diameter slightly larger than the inner section (397) of female snap connector (375). The centrally located opening (386) of protective cover (378) abuts and is affixed to the top (396) of female snap connector (375) along the circumference of outer section (399) of female snap connector (375). Typically, protective cover (378) is made of a rigid plastic which prevents debris from entering and clogging chamber (310).

Normally, housing chamber (310) is also made from a rigid plastic material which protects inner pipe member (360) and female snap connector (375) from normal lawn traffic. Additionally, chamber (310) protects the water flow through inner pipe member (360) from obstruction by pressure from the earth settlement.

Referring back to the illustrated embodiment in FIG. 3, 90 degree elbow fitting (380) is shown having distal end (383) being parallel to the ground surface and proximate end (385) being perpendicular to the ground surface. Male snap connector (390) is shown affixed to proximate end (385) and female fitting means (395) is shown affixed to distal end (383). Internal threading (384), circumferentially disposed within distal end (383), is shown screwed to water hose (130). Water hose (130) connection to 90 degree elbow fitting (380) allows water hose (130) to lay parallel to the ground surface.

Referring back to FIG. 3A, male snap connector (390) is depicted interconnected with the inner section (397) of female snap connector (375). In this embodiment, female snap connector (375) is depicted having spring (315) surrounding inner wall (317) of female snap connector (375). The applying pressure to protective cover (378) forces spring (315) to compress which releases the connection between female snap connector (375) and male snap connector (390).

Figure 4:
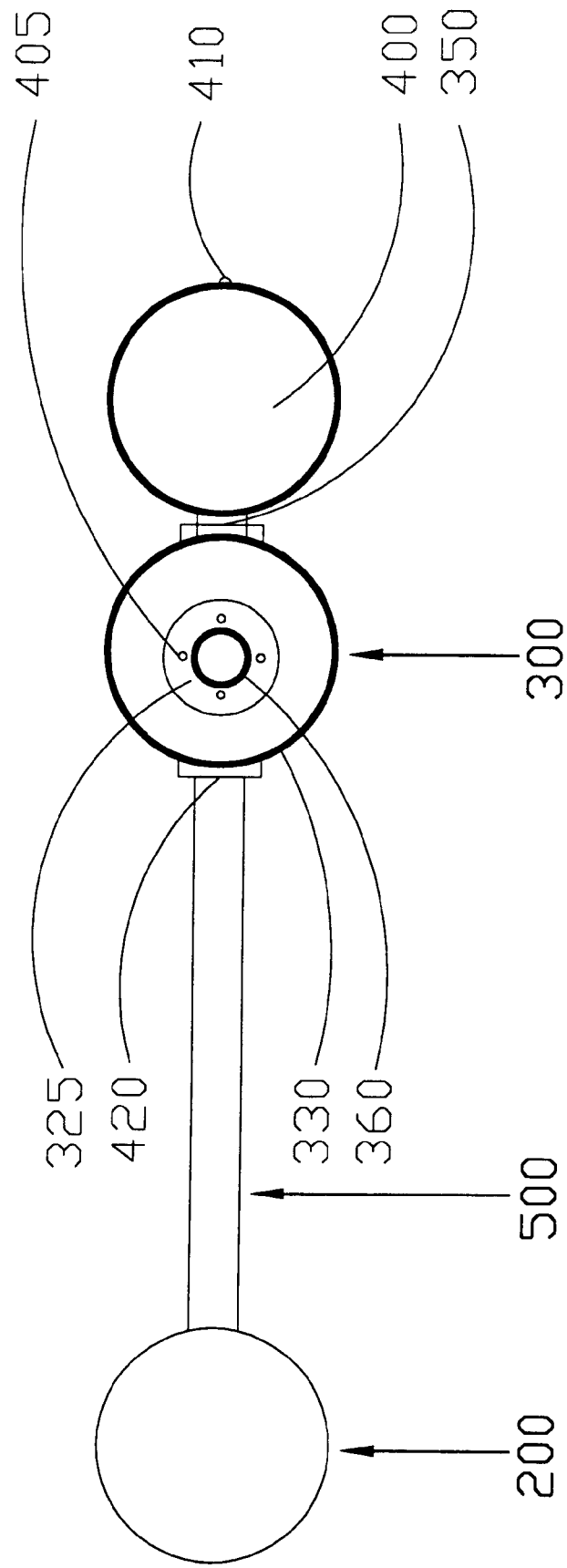
FIG. 4 is an exploded top view of the housing.

Referring now to FIG. 4, there is shown an exploded top view of housing (300). In the embodiment illustrated in FIG. 4, housing (300) is shown having small apertures (405) in tapered bottom (325). In this kind of embodiment, if excess water seeps into chamber (310) during normal lawn and garden watering, the excess water passes through small apertures (405) into the ground. The illustrated embodiment further includes ball latch (410) connected to protective lid (400) at a position directly opposite from spring hinge (350). Additionally, catch (420) is securely attached to the outer periphery of cylindrical wall (330) of housing (300) at a position directly across from spring hinge (350).

Figure 4A:
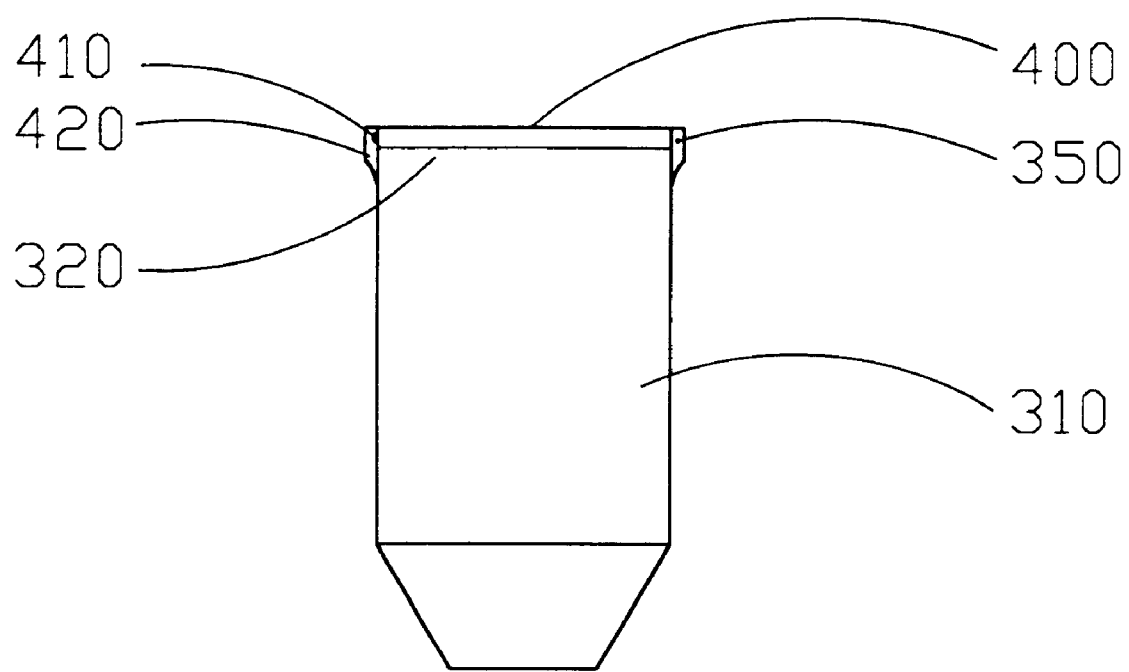
FIG. 4A is an exploded side view of the housing with the lid in a close position.

Referring now to the embodiment illustrated in FIG. 4A, when protective lid (400) is in a closed position, ball latch (410) mates with catch (420) and encloses catch (420) to securely connect protective lid (400) to the outer wall of chamber (310). In this kind of embodiment, the compression of lid (400) causes spring hinge (350) to release ball latch (410) from catch (420). Additionally, when in a closed position, protective lid (400) rests upon opened top end (320) and protects debris from entering chamber (310).

Figure 5:
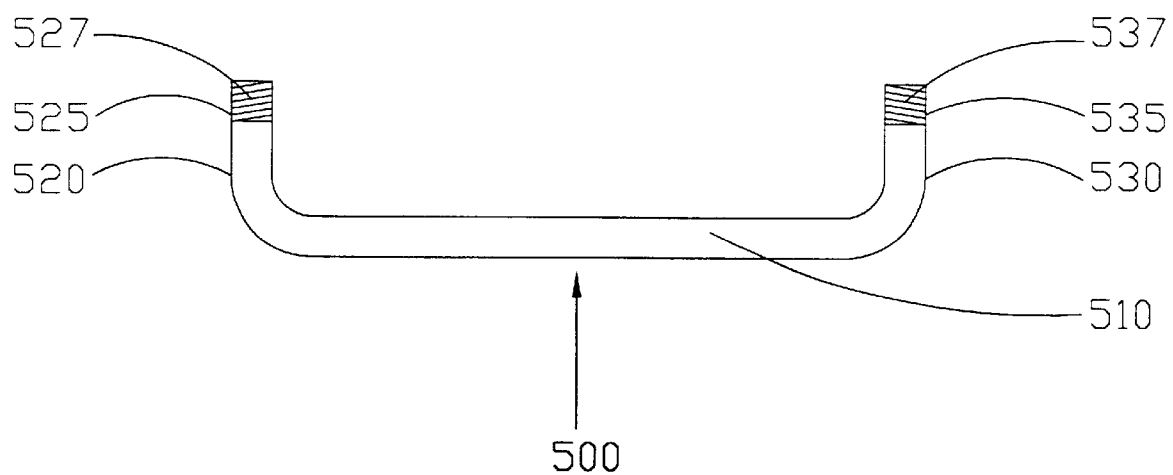
FIG. 5 is an exploded side view of the U-shape pipe member.

Referring now to FIG. 5, there is shown an exploded side view of second pipe member (500). In the illustrated embodiment, second pipe member (500) is depicted having a U-shape with base (510) being parallel to the ground surface and legs (520, 530) being perpendicular to the ground surface. Each leg (520, 530) is shown respectively having male fitting means (525, 535) with exterior threading (527, 537) circumferentially disposed around the upper end of each leg (520, 530). Typically, second pipe member (500) is typically made of poly vinyl chloride (PVC), a form of thermoplastic. During the manufacturing process, PVC pipe is adapted into a U-shape to create second pipe member (500). Generally, the strength of the PVC pipe prevents the pressure of earth settlement from obstructing the water flow through second pipe member (500).

Referring back to FIG. 1, second pipe member (500) is shown buried below ground level beneath pop-up sprinkler (200) and housing (300). Base (510) lays parallel to the ground surface and extends the distance between pop-up sprinkler (200) and housing (300). In the illustrated embodiment, leg (530) is shown buried beneath housing (300) and leg (520) is shown buried beneath pop-up sprinkler (200). The illustrated embodiment further includes exterior threading (537) of male fitting means (535) screwed into the internal threading (373) of female fitting means (370) of housing (300). Additionally, external threading (527) of male fitting means (525) is depicted screwed the internal threading (240) of into female fitting means (230) of pop-up sprinkler (200). The interconnection of second pipe member (500) to pop-up sprinkler (200) and housing (300) provides the conduit which allows water to be transported under pressure from outdoor water faucet (120) to pop-up sprinkler (200) for the irrigation of lawns and gardens.

Figure 6:
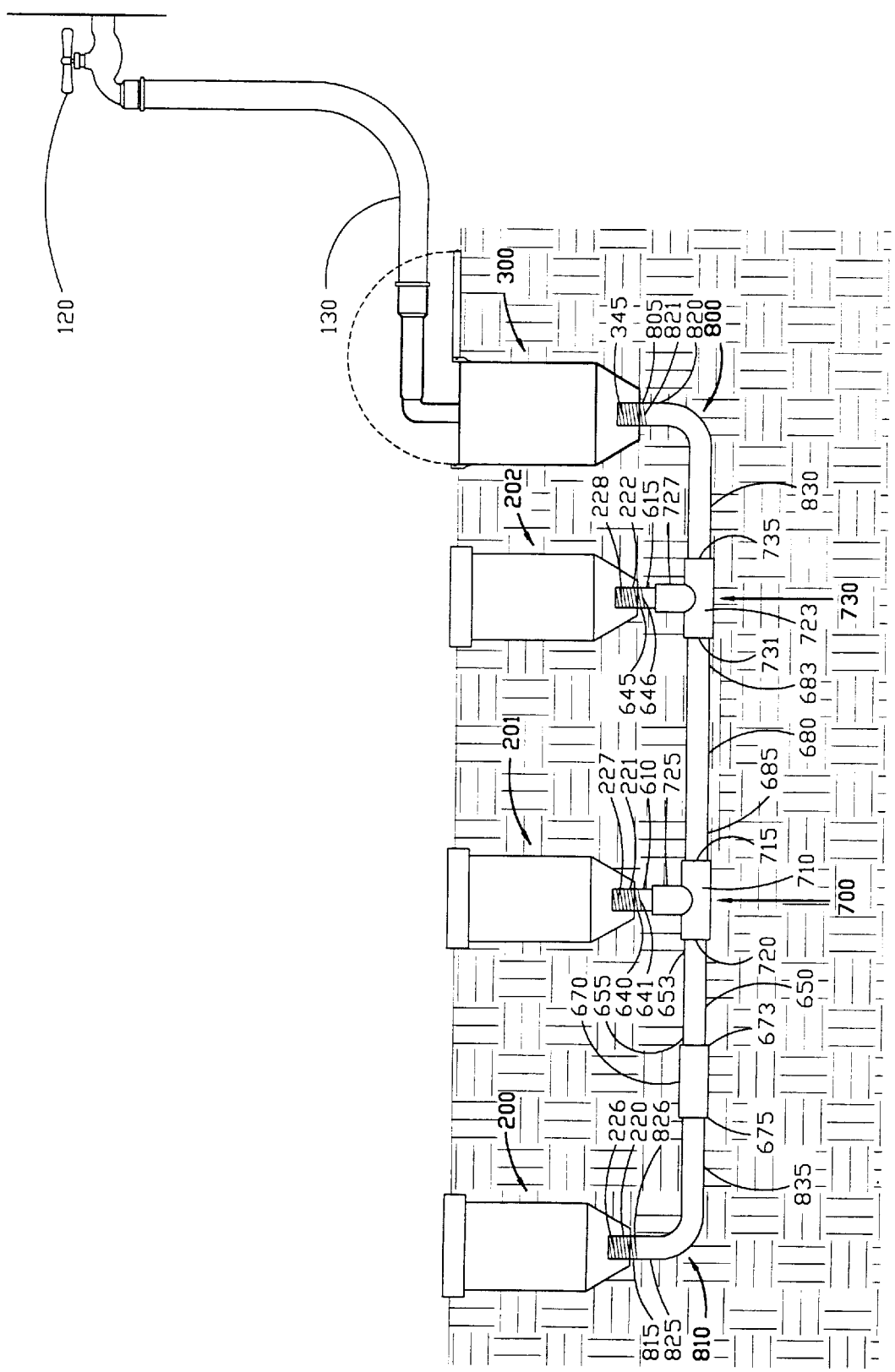
FIG. 6 is a perspective view of an alternative embodiment of the present invention.

Referring now to FIG. 6, an alternative embodiment of the present invention is seen. In the illustrated embodiment, a plurality of pop-up sprinklers (200, 201, 202) are shown buried below ground level in the lawn area. At a position relative to pop-up sprinkler (202), housing (300) is also buried below ground level in the lawn area Water is transported under pressure from outdoor water faucet (120) through water hose (130) into a conduit of interconnected pipes to each pop-up sprinkler (200, 201, 202). The conduit of interconnected pipes will be described in detail below.

In the embodiment illustrated in FIG. 6, each pop-up sprinkler (200, 201, 202) have a particular water output, for example, 20 gallons per minute (gpm). In order for water faucet (120) to support interconnected pop-sprinklers (200, 201, 202), water faucet (120) output in gallons per minute must be greater than or equal to the combined water output of each pop-up sprinkler (200, 201, 202). For example, if pop-up sprinklers (200, 201, 202) each output 20 gpm, then the output of water faucet (120) must be at least 60 gpm.

The embodiment illustrated in FIG. 6 further includes, each pop-up sprinkler (200, 201, 202) having bottom inlets (220, 221, 222) with female fitting means (226, 227, 228) respectively, affixed therein. Each female fitting means (226, 227, 228) is depicted having interior threading circumferentially disposed respectively within bottom inlets (220, 221, 222).

The embodiment in FIG. 6 further includes, a plurality of extending pipe members (610, 615) equivalent to the number of additional pop-up sprinklers (201, 202). Each extending pipe member (610, 615) is depicted interconnecting each additional pop-up sprinkler (201, 202) to T-Connector means (700, 730). The interconnection of each extending pipe member (610, 615) to each additional pop-up sprinkler (201, 202) provides water flow from outdoor faucet (120) to pop-up sprinklers (201, 202).

Figure 7:
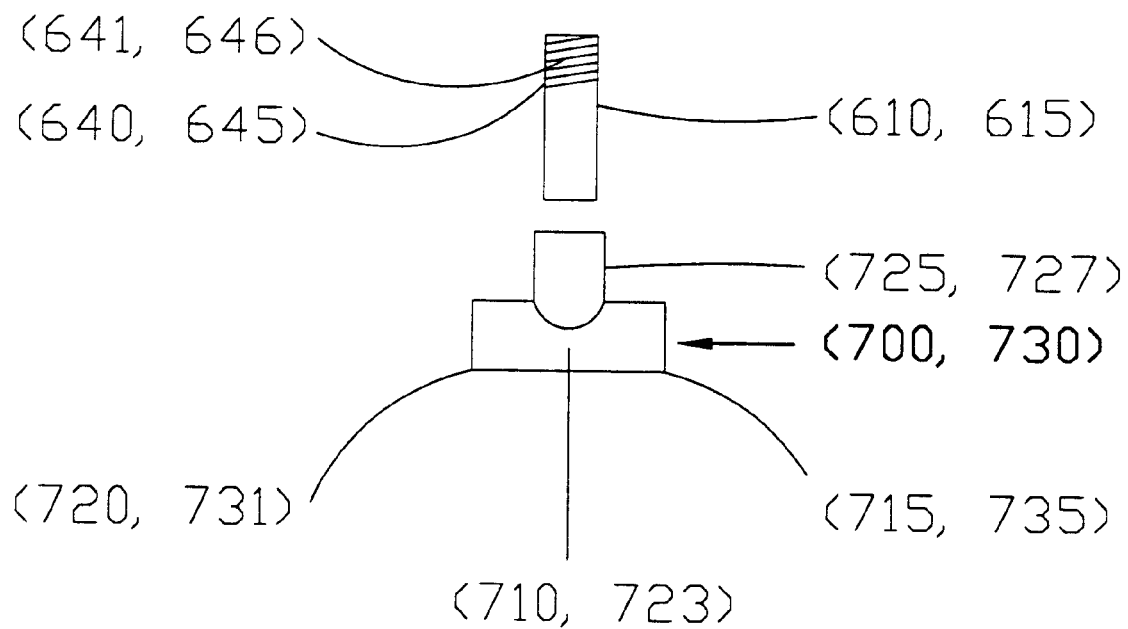
FIG. 7 is an exploded side view of an extension pipe member and a T-Connector means.

Referring now to FIG. 7, there is illustrated an exploded frontal view of extending pipe members (610, 615) respectively connected to T-Connector means (700, 730). In the illustrated embodiment, T-Connector means (700, 730) are depicted having hollow horizontal members (710, 723). In this embodiment, horizontal member (710) is shown having coupling means (715, 720) disposed on opposite ends. Additionally, horizontal member (730) is shown having coupling means (731, 735) disposed on opposite ends. The illustrated embodiment further includes, transition coupling means (725, 727) connected at a central position perpendicular to horizontal members (710, 723). Referring back to FIG. 6, the opened lower end of extending pipe members (610, 615) are inserted into transition coupling means (725, 727). Generally, to form a secure connection cementing material is applied at the point of insertion between extending pipe members (610, 615) and transition coupling means (725, 727).

Referring again to the illustrated embodiment in FIG. 7, extending pipe members (610, 615) are shown having male fitting means (640, 645) respectively affixed to their upper ends. In this kind of embodiment, male fitting means (640, 645) are shown having external threading (641, 646) respectively circumferentially disposed around the upper end of extending pipe members (610, 615). Referring back to FIG. 6, to interconnect pop-up sprinklers (201, 202) to T-Connectors (700, 730), external threading (641, 646) of male fitting means (640, 645) are depicted being respectively screwed into internal threading (227, 228) of female fitting means (221, 222).

Figure 8:
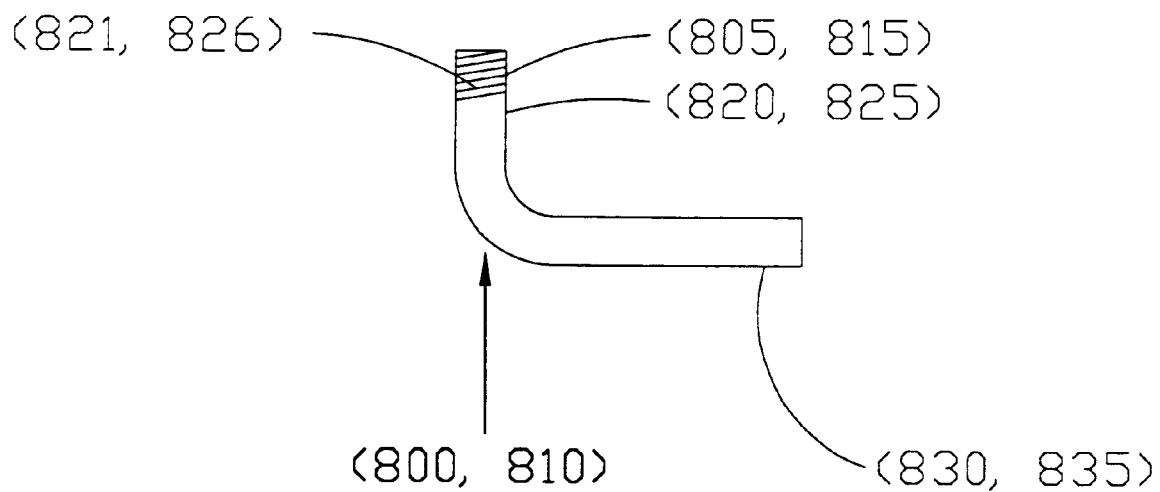
FIG. 8 is an exploded side view of the two elbow pipe members.

The embodiment illustrated in FIG. 6 further includes, 90 degree elbow pipe members (800, 810) respectively, interconnected to housing (300) and pop-up sprinkler (200). Referring now to FIG. 8, there is illustrated an exploded frontal view of elbow pipe members (800, 810). In the illustrated embodiment, elbow pipe members (800, 810) are shown having proximate ends (820, 825) being perpendicular to the ground surface and distal ends (830, 835) being parallel to the ground surface. Proximate ends (820, 825) are depicting having male fitting means (805, 815) with external threading (821, 826) respectively circumferentially disposed around proximate ends (820, 825). Referring back to FIG. 6, external threading (821, 826) of the male fitting means (805, 815) of 90 degree elbow pipe members (800, 810) are respectively screwed into the internal threading (345) of housing (300) and the internal threading (226) of pop-up sprinkler (200).

Elbow pipe members (800, 810) are typically made of PVC, a form of thermoplastic. During the manufacturing process, the PVC pipe is adapted into an elbow shape to create elbow pipe members (800, 810). In this kind of embodiment, the strength of the PVC pipe prevents the earth settlement from obstructing the water flow through the elbow pipe members (800, 810).

The illustrated embodiment in FIG. 6, further includes a first connecting pipe member (650) and an extension coupling (670) respectively having first ends (653, 673) and opposite second ends (655, 675). In the illustrated embodiment, first end (653) of first connecting pipe member (650) is inserted into second coupling means (720) of the horizontal member (710) of T-Connector means (700). Additionally, second end (655) of first connecting pipe member (650) is inserted into first end (673) of extension coupling (670). Distal end (835) of elbow pipe member (810) is inserted into the second end (675) of extension coupling (670). Generally, in order to form a secure connection among elbow pipe member (810), extension coupling (670), first connecting pipe member (650) and T-Connector (700), cemented material is applied at their points of insertion.

The embodiment in FIG. 6 further includes, second pipe member (680) having first end (683) and opposite second end (685). The first end (683) of second pipe member (680) is inserted into the second end (731) of horizontal member (723) of T-Connector (730). The second end (685) of second pipe member (680) is inserted into the first end (715) of horizontal member (710) of T-Connector (700). To form a secure connection among T-Connector (700), second pipe member (680), and T-Connector (730), cementing material is applied at their points of insertion.

In conclusion, the conduit of interconnected pipes illustrated in FIG. 6 between pop-up sprinklers (200, 201, 202) and housing (300), allows water to be transported under pressure to each pop-up sprinkler (200, 201, 202) such that water is distributed to the lawn and garden areas.

What is claimed is:

1. A device for irrigating lawn and gardens utilizing a water hose connected to an above ground water supply, the device comprising:
    an underground pop-up sprinkler having a bottom inlet with a female fitting means affixed therein whereby the bottom inlet receives water under pressure;
    a housing buried below ground level at a position relative to the pop-up sprinkler, wherein the housing is comprised of:
        a chamber having an opened top end and a tapered bottom with a vertical cylindrical wall therebetween, the tapered bottom extending downward into a centrally located orifice;
        a protective lid having a diameter the size of the opened top end of the chamber, the lid abutting the opened top end of the chamber;
        a spring hinge configured to connect the lid to the top end of the chamber such that the lid opens upward in a direction parallel to the ground level; and
        an inner pipe member concentrically positioned within the chamber, the inner pipe member having an externally threaded top portion and an opened bottom end securely attached to the orifice, the opened bottom end of the inner pipe member having a female fitting means affixed therein;
    a second pipe member adapted into a U-shape and buried below ground level beneath the pop-up sprinkler and the housing, the second pipe member having a base and two legs, the base being parallel to the ground surface and extending a distance between the pop-up sprinkler and the housing;
    the second leg being buried beneath the housing and having an upper end with a male fitting means affixed thereto;
    the male fitting means of the second leg being securely received by the female fitting means of the housing;
    the first leg being buried beneath the pop-up sprinkler and having an upper end with a male fitting means affixed thereto;
    the male fitting means of the first leg being securely received by the female fitting means of the pop-up sprinkler; and
    a means for securely attaching the threaded top portion of the inner pipe member to the water hose whereby water is transported under pressure from the above ground water supply to the pop-up sprinkler.

2. The device of claim 1, wherein the means for securely attaching the threaded top portion of the inner pipe member further comprises:
    a cylindrical female snap connector means having a top and a bottom; the bottom being connected to the threaded top portion of the inner pipe member; the top having an inner section concentrically positioned within an outer section;
    a protective cover having a centrally located opening with a diameter slightly larger than the inner section of the female snap connector means;
    the central opening of the protective covering abutting the top of the female snap connector means along the circumference of the outer section;
    a 90 degree elbow fitting located above ground level, the elbow fitting having a distal and a proximate end, the proximate end being perpendicular to the ground surface and having a male snap connector means affixed thereto, the distal end being parallel to the ground surface and having a female fitting means securely attached to the water hose;
    the inner section of the female snap connector means being interconnected with the male snap connector means; and
    the central opening of the protective covering affixed to the female snap connector means along the circumference of the outer section whereby the compression of the protective cover releases the male snap connector means from the inner section of the female snap connector means.

3. The device of claim 2, wherein the protective cover has a diameter slightly smaller than the opening of the top end of the housing chamber whereby the protective cover rests within the opening of the top end of the housing chamber.

4. The device of claim 1, wherein the tapered bottom of the housing contains a plurality of apertures whereby excess water from normal lawn and gardening watering passes through the housing into the ground.

5. The device of claim 1, further comprising:
    a ball latch connected to the lid at a position directly opposite from the spring hinge; and
    a catch securely attached to the outer periphery of the cylindrical wall of the housing chamber at a position directly across from the spring hinge wherein the ball latch mates with the catch when the lid is in a closed position.

6. The device of claim 1, wherein the orifice in the bottom end of the housing has a diameter the size of the bottom end of the inner pipe member.

7. The device of claim 1, wherein the length of the inner pipe member is adapted to fit between the female snap connector and the orifice in the housing.

8. The device of claim 1, wherein the inner pipe member and the second pipe member are made of thermoplastic.

9. A device for irrigating lawn and gardens utilizing a water hose connected to an above ground water supply, the device comprising:
    a first underground pop-up sprinkler having a bottom inlet with a female fitting means affixed therein whereby the bottom inlet receives water under pressure;
    at least one additional pop-up sprinkler buried below ground level at a position relative to the first pop-up sprinkler, the at least one additional pop-up sprinkler having a bottom inlet with a female fitting means affixed therein whereby the bottom inlet receives water under pressure;

a housing buried below ground level at a position relative to the at least one additional pop-up sprinkler, wherein the housing is comprised of:
  a chamber having an opened top end and a tapered bottom with a vertical cylindrical wall therebetween, the tapered bottom extending downward into a centrally located orifice;
  a protective lid having a diameter the size of the opened top end of the chamber, the lid abutting the opened top end of the chamber;
  a spring hinge configured to connect the lid to the top end of the chamber such that the lid opens upward in a direction parallel to the ground level; and
  an inner pipe member concentrically positioned within the chamber, the inner pipe member having an externally threaded top portion and an opened bottom end securely attached to the orifice, the opened bottom end of the inner pipe member having a female fitting means affixed therein;

two 90 degree elbow pipe members, the first elbow pipe member being buried below ground level beneath the first pop-up sprinkler, the second elbow pipe member being buried below ground level below the housing;

the first and second elbow pipe members having an opened proximate end being parallel to the ground surface and an opened distal end being perpendicular to the ground surface;

the distal end of each elbow pipe member having a male fitting means affixed thereto;

the male fitting means of the second elbow pipe member being securely received by the female fitting means in the housing;

the male fitting means of the first elbow pipe member being securely received by the female fitting means of the first pop-up sprinkler, for each additional pop-up sprinkler, an extending pipe member and a T-Connector means;

each extending pipe member having an opened lower end and an upper end having a male fitting means affixed thereto;

the male fitting means of each extending pipe member being securely received by the female fitting means of each additional pop-up sprinkler;

each T-Connector means securely attached to the lower end of each extending pipe member wherein the proximate end of the first elbow pipe member is interconnected to the proximate end of the second elbow pipe member; and a means for securely attaching the threaded top portion of the inner pipe member to the water hose whereby water is transported under pressure from the above ground water supply to the first pop-up sprinkler and each additional pop-up sprinkler.

10. The device of claim 9, wherein the means for securely attaching the threaded top portion of the inner pipe member further comprises:
  a cylindrical female snap connector means having a top and a bottom; the bottom being connected to the threaded top portion of the inner pipe member; the top having an inner section concentrically positioned within an outer section;
  a protective cover having a centrally located opening with a diameter slightly larger than the inner section of the female snap connector means;
  the central opening of the protective covering abutting the top of the female snap connector means along the circumference of the outer section;
  a 90 degree elbow fitting located above ground level, the elbow fitting having a distal and proximate end, the proximate end being perpendicular to the ground surface and having a male snap connector means affixed thereto, the distal end being parallel to the ground surface and having a female fitting means securely attached to the water hose;
  the inner section of the female snap connector means being interconnected with the male snap connector means; and
  the central opening of the protective covering affixed to the female snap connector means along the circumference of the outer section whereby the compression of the protective covering releases the male snap connector means from the inner section of the female snap connector means.

11. The device of claim 10, wherein the protective cover has a diameter slightly smaller than the opening of the top end of the housing chamber whereby the protective cover rests within the opening of the top end of the housing chamber.

12. The device of claim 9, wherein the tapered bottom of the housing contains a plurality of apertures whereby excess water from normal lawn and gardening watering passes through the housing into the ground.

13. The device of claim 9, further comprising:
  a ball latch connected to the lid at a position directly opposite from the spring hinge; and
  a catch securely attached to the outer periphery of the cylindrical wall of the housing chamber at a position directly across from the spring hinge wherein the ball latch mates with the catch when the lid is in a closed position.

14. The device of claim 9, wherein the orifice in the bottom end of the housing has a diameter the size of the bottom end of the inner pipe member.

15. The device of claim 9, wherein the length of the inner pipe member is adapted to fit between the female snap connector and the orifice in the housing.

16. The device of claim 9, wherein the inner pipe member and each 90 degree elbow pipe member are made of thermoplastic.

17. The device of claim 9, wherein each T-Connector means further comprises:
  a hollow horizontal member having a pair of coupling means having a first end and an opposite second end;
  a hollow vertical transition coupling connected at a central position perpendicular to the horizontal member;
  the lower end of the extending pipe member securely attached to the transition coupling; an extension coupling having a first end and an opposite second end;
  a first connecting pipe member having a first end being securely attached to the second end of the coupling means of the horizontal member to the first end of the extension coupling and an opposite second end being securely attached to the first end of the extension coupling;
  the first end of the coupling means of the horizontal member being securely attached to the proximate end of the second elbow pipe member; and the proximate end of the first elbow pipe member securely attached to the second end of the extension coupling.

18. The device of claim 17, further comprising:

at least one second connecting pipe member connected between two T-Connector means;

and the second connecting pipe member having a first end being securely attached to the second end of the coupling means of the horizontal member of the first T-Connector means and an opposite second end being securely attached to the first end of the coupling means of the horizontal member of the second T-Connector means.

* * * * *